No. 771,887. PATENTED OCT. 11, 1904.
J. A. THOMAS.
LONGITUDINALLY ADJUSTABLE CRUSHING ROLLS.
APPLICATION FILED JAN. 27, 1903.
NO MODEL.
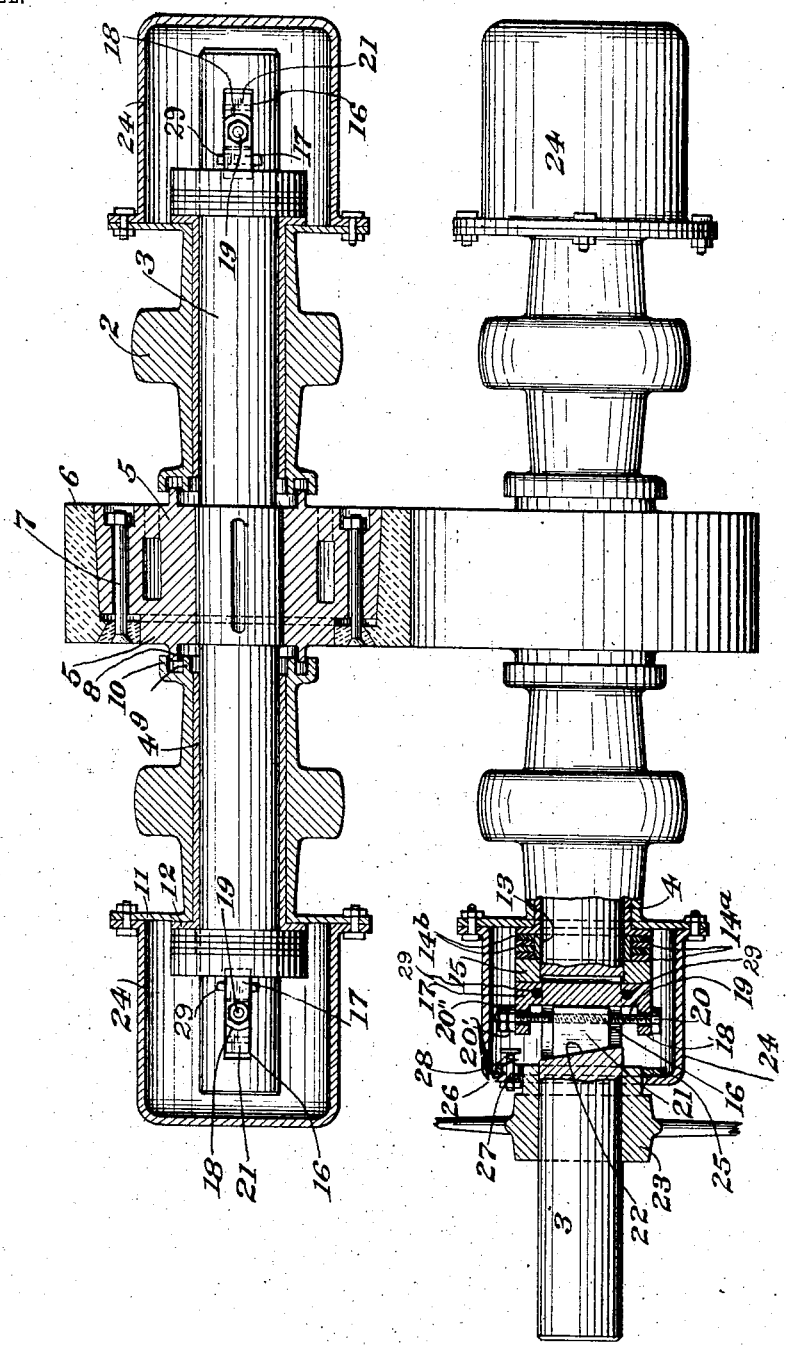
Witnesses
Geo. L. Goetz
Frederick Lyon
Inventor
James A. Thomas
by Townsend Bro.
his attys.

No. 771,887.

Patented October 11, 1904.

UNITED STATES PATENT OFFICE.

JAMES A. THOMAS, OF LOS ANGELES, CALIFORNIA.

LONGITUDINALLY-ADJUSTABLE CRUSHING-ROLLS.

SPECIFICATION forming part of Letters Patent No. 771,887, dated October 11, 1904.

Application filed January 27, 1903. Serial No. 140,807. (No model.)

*To all whom it may concern:*

Be it known that I, JAMES A. THOMAS, a citizen of the United States, residing at Los Angeles, in the county of Los Angeles and State of California, have invented new and useful Improvements in Longitudinally-Adjustable Crushing-Rolls, of which the following is a specification.

This invention relates to crushing-rolls, and particularly to crushing-rolls of the "Cornish" type, and has for its general object the provision of simple, cheap, and durable means whereby the roll-shafts, and therewith the rolls, may be longitudinally moved or adjusted with respect to each other to prevent their corrugation or the formation of flanges thereon and in case flanges or corrugations have formed to provide such adjustment whereby such flanges or corrugations may be ground off by the operation of the rolls.

A further object is to provide such means in most simple, positive, and efficient form, whereby the longitudinal adjustment may be most positively and effectually controlled.

A further object is to provide such means in a form whereby the wear will come upon cheap and easily detached and replaced parts, avoiding the rapid wearing of the expensive shafts.

A further object is to provide in combination with such means suitable protecting means to keep out all dust and dirt from the parts of the adjustment devices.

Other and further objects and ends will hereinafter appear from the detailed description of construction and operation.

To these ends the invention consists generally in the constructions and in general and specific combinations of parts and mechanisms, as hereinafter described, and particularly set forth in the claims.

The invention will be more readily understood by reference to the accompanying drawing, forming part of this specification, and in which the figure is a plan view of crushing-rolls embodying my invention, portions being sectioned to more clearly show the construction.

As shown in the drawing, 2 represents journal-boxes, which may be of any ordinary or preferred construction.

3 represents the roll-shafts.

4 represents brass bushings interposed in the bearings of the journal-boxes and in which the shafts rotate and in which the shafts are longitudinally movable.

5 represents the crushing-rolls, which are preferably provided with renewable hardened shells 6 of any ordinary or preferred construction. In the drawing the shells 6 are shown as secured on the rolls 5 by bolts 7, though any suitable means may be employed. As shown, the rolls 5 are provided with flanges 8, adapted to revolve in housings formed by flanges 9 and 10, provided on the journal-boxes. These housings are of sufficient width to permit the desired longitudinal adjustment of the rolls and form substantially dust-proof bearings for the rolls.

The journal-boxes 2 are provided at their ends with flanges 11, and against the ends of the journal-boxes, and preferably up against the flanges 11, extend the flanges 12 of the bushings 4. About the shafts 3 are brass bushings 13, the inner ends of these bushings bearing against the bushings 4.

$14^a$ $14^b$ represent, respectively, brass and steel thrust-rings provided on the bushings 13, the outer steel thrust-rings $14^b$ bearing against the flanges 12 of the bushings 4. Collars 15 are provided on the shafts 3 and bear against the outer brass thrust-rings $14^a$. The shafts are provided with radial slots 16, running therethrough and of sufficient length longitudinally of the shafts to permit the desired length of longitudinal adjustment of the shafts. In these slots are gibs 17, the inner faces of which bear against the collars 15. The gibs are each provided with arms or lugs 18. The arms or lugs 18 are provided with perforations or holes, through which an adjusting screw or bolt 19 is inserted, the head 20 being adapted to bear upon the outer surface on one of the arms or lugs, and at the other end the bolt has two nuts $20'$ $20''$, by means of which the bolt is locked against movement. A key or cam-block 21 has a threaded bearing through which the shank of the adjusting screw or bolt passes, the thread of shank being adapted to engage the thread of the bearing. The key or cam-block has an inclined outer edge or face of similar pitch with the inclined wall 22 of the slot 16, against which it is adapted to bear. The opposite edge or face of the key or cam-block is a straight edge corresponding with the straight face of the gib against which it is adapted to bear. Each gib 17 is provided with means for preventing transverse movement thereof relatively to the shaft during the adjusting operation—for example, pins 29, extending through the gib on either side of the shaft and projecting over the shaft.

23 represents a suitable driving-pulley of the ordinary or any preferred construction.

24 represents dust-caps bolted to the flanges 11 of the journal-boxes and through which the ends of the shafts protrude.

25 represents a wood-fiber dust-collar inside the dust-cap and about the shaft. This dust-collar has a perforation or opening 26, through which the bolt 27 passes. A spring 28 is mounted on the inner end of this bolt and has one end bearing against the head of the bolt, the other end engaging the dust-cap. The outer end of the bolt is provided with a suitable retaining and adjusting nut. The perforation or opening 26 is larger than the bolt to provide for the play of the collar on the shaft.

When it is desired to adjust the rolls either to prevent the formation of flanges thereon or the corrugation thereof or to grind off flanges or corrugations which may have appeared by loosening the lock-nut 20″, the nut 20′ may be turned sufficiently to permit the bolt to be turned. The turning of the bolt causes the key or cam-block 21 to move on the thread of the bolt. It is obvious that the key or cam-block at one end of the shaft having been moved so that the inclined face thereof is free from the inclined wall 22 of the slot by turning the bolt 19 at the other end of the shaft and forcing the key or cam-block at that end down against the inclined face 22 of its slot the shaft is forced to move longitudinally.

What I claim, and desire to secure by Letters Patent of the United States, is—

1. The combination, with journal-boxes, of a shaft rotatably and longitudinally movable therein, a roll fixed on said shaft, said shaft provided with transverse perforations or slots, gibs in said slots adapted to exert pressure against said journal-boxes, keys bearing against said gibs and against said shaft, and means operatively connecting said gibs and keys whereby the same may be operated to move said shaft longitudinally.

2. The combination, with journal-boxes, of shafts rotatably and longitudinally movable therein, rolls fixed to said shafts, said shafts provided with perforations or slots, gibs operatively connected with said journal-boxes, keys in said slots bearing against said shafts, and means carried by said gibs whereby said keys may be operated to move said shafts longitudinally.

3. The combination, with journal-boxes, of shafts rotatably and longitudinally movable therein, rolls fixed to said shafts, said shafts provided with perforations or slots, gibs operatively connected with said journal-boxes, keys in said slots bearing against said shafts, and operating-bolts carried by said gibs and passing through said keys, whereby said keys may be moved to move said shafts longitudinally.

4. The combination, with journal-boxes, of shafts rotatably and longitudinally movable therein, rolls fixed to said shafts, said shafts provided with transverse perforations or slots, one of the walls of said slots being inclined, gibs operating against said journal-boxes, keys in said slots having inclined portions bearing against said inclined walls of said slots, and means operatively connecting said gibs and keys whereby the same may be operated to move said shafts longitudinally.

5. The combination, with journal-boxes, of shafts rotatably and longitudinally movable therein, rolls fixed thereon, thrust-rings upon said shafts adapted to exert pressure against said journal-boxes, said shafts provided with perforations or slots, keys in said slots bearing against the walls thereof, and means operatively connecting said gibs and keys and for moving said keys to move said shafts.

6. The combination with journal-boxes and bushings therein, of shafts rotatably and longitudinally movable therein, rolls fixed thereon, bushings about said shafts, alternate steel and brass thrust-rings about said bushings, collars bearing against said rings, said shafts provided with perforations or slots having inclined forward walls, keys in said slots, said keys and shafts having oppositely-inclined portions adapted to bear on one another, positive means for operating said keys, and gibs carrying said means, said gibs bearing against said collars.

7. The combination, with journal-boxes, of shafts rotatably and longitudinally movable therein, rolls on said shafts, said shafts having perforations or slots, said slots having inclined walls, keys therein, said keys having portions oppositely inclined to the inclination of said walls, gibs adapted to exert pressure against said journal-boxes, and means on said gibs for operating said keys.

8. The combination, with journal-boxes, of shafts rotatably and longitudinally movable therein, rolls fixed on said shafts, said shafts having perforations or slots, said slots having inclined walls, keys therein having portions oppositely inclined to the inclination of said walls, gibs adapted to exert pressure against said journal-boxes, said gibs having lugs or projections, and adjusting-bolts passing through said lugs or projections and engaging said keys whereby the keys may be moved.

In testimony whereof I have signed my name to this specification, in the presence of two subscribing witnesses, at Los Angeles, in the county of Los Angeles and State of California, this 16th day of January, 1903.

JAMES A. THOMAS.

Witnesses:
FREDERICK S. LYON,
JOHN LLEWELLYN.